US007523204B2

(12) United States Patent
D'Costa et al.

(10) Patent No.: US 7,523,204 B2
(45) Date of Patent: Apr. 21, 2009

(54) COORDINATED QUIESCE OF A DISTRIBUTED FILE SYSTEM

(75) Inventors: Austin Franky Manuel D'Costa, Beaverton, OR (US); James John Seeger, Portland, OR (US); David Macnaughton Wolfe, Portland, OR (US); David Daniel Zimmermann, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 10/859,407

(22) Filed: Jun. 1, 2004

(65) Prior Publication Data

US 2005/0267897 A1 Dec. 1, 2005

(51) Int. Cl.
*G06F 15/16* (2006.01)

(52) U.S. Cl. .................. 709/226; 709/206; 709/223; 709/208

(58) Field of Classification Search ........... 709/226, 709/206, 208; 707/202; 710/100
See application file for complete search history.

(56) References Cited

U.S. PATENT DOCUMENTS

| | | | | |
|---|---|---|---|---|
| 5,339,397 | A | 8/1994 | Eikill et al. ............. | 395/400 |
| 5,692,155 | A | 11/1997 | Iskiyan et al. ........... | 395/489 |
| 6,006,259 | A * | 12/1999 | Adelman et al. ......... | 709/223 |
| 6,401,120 | B1 * | 6/2002 | Gamache et al. ........ | 709/226 |
| 6,438,582 | B1 * | 8/2002 | Hsiao et al. ............. | 709/206 |
| 6,587,860 | B1 * | 7/2003 | Chandra et al. ......... | 707/202 |
| 6,862,613 | B1 * | 3/2005 | Kumar et al. ........... | 709/220 |
| 6,938,084 | B2 * | 8/2005 | Gamache et al. ........ | 709/226 |
| 6,965,957 | B1 * | 11/2005 | Nguyen ................. | 710/100 |
| 7,020,695 | B1 * | 3/2006 | Kundu et al. ........... | 709/223 |
| 2002/0161869 | A1 * | 10/2002 | Griffin et al. .......... | 709/221 |
| 2003/0028736 | A1 | 2/2003 | Berkowitz et al. ...... | 711/162 |
| 2003/0188115 | A1 | 10/2003 | Maezawa ............... | 711/162 |

OTHER PUBLICATIONS

Gamache, "The Design and Architecture of the Microsoft Cluster Service", 1998.*
Oracle, "Oracle9i Real Application Clusters", Mar. 2002.*
Microsoft, "Microsoft Cluster Service", Jun. 2001.*
Lomet, "Consistent Timestamping for Transactions in Distributed Systems", Sep. 1990.*
Kota, "Designing Efficient Inter-Cluster Communication Layer For Distributed Computing", 2001.*
Sorenson, "Configuring and Managing a Cluster", 2000-2004, Red Hat.*
Sun Microsystems, "Robust Clustering: A Compariosn of Sun Cluster 3.0 versus Sun Cluster 2.2 Software", Sep. 2001.*

* cited by examiner

*Primary Examiner*—Liangche Wang
*Assistant Examiner*—O. C Vostal
(74) *Attorney, Agent, or Firm*—Lieberman & Brandsdorfer, LLC

(57) ABSTRACT

A process for quiescing a master (master) and a plurality of subordinate computer systems (subordinates) in a cluster. An original or a pending state may be entered that is a quiesce or an online state. The master instructs the subordinates the quiesce or online state be made the pending state. The subordinates prepare to change accordingly, determine whether successful, and vote to commit or abort. Based on whether all voted to commit, the master instructs the subordinates to either commit or abort. If to commit and the pending state is the quiesce state, an operation is performed in the subordinates. If to commit and the pending state is the online state, the subordinates prepare to resume the original state. The subordinates change from the original to the pending state. Otherwise, if to abort, the subordinates prepare to remain in the original state and reset the pending to the original state.

21 Claims, 3 Drawing Sheets

COORDINATED QUIESCE OF A DISTRIBUTED FILE SYSTEM

BACKGROUND OF THE INVENTION

The present invention relates generally to distributed, networks of computer systems, specifically computer clusters, and more particularly to systems and techniques to quiesce the entire data storage system of such a computer cluster for operations where this is useful or necessary, such as performing a cluster-wide data backup.

Among the recent trends in data processing is the use of distributed collections of server computer systems to collect and process data for client computer systems. An entire such collection of computer systems is often termed a "cluster" and the clients and servers are spoken of as conducting "transactions" wherein the clients provide or request data from the servers and the servers store or process data for the clients. Many clusters today contain large numbers of client and server computer systems, wherein very large numbers of transactions take place.

As with virtually all computer systems, the data stored in cluster computer systems needs to be backed up from time to time. A key goal in performing a backup is to copy all of the data present in a manner so that the system being backed up can be restored exactly as it was at a particular time. However, this tends to be particularly difficult due to many factors.

For instance, a cluster contains many computer systems, yet the completeness of a backup is undermined if the data from even one computer system in the cluster is omitted. For this reason, a computer system crash or even a temporary unavailability for other reasons that prevents some data being backed up must be guarded against.

In addition to merely backup completeness, timing often plays a role. In many clusters, the computer systems conduct multiple asynchronous transactions concurrently, yet the clients and servers cannot be in mid-transaction when data is being backed up. At the clients, all transactions need to be either completed or forced to reinitiate later, after the backup. At the servers, all of the transactions also need to be completed, or flushed so that later reinitiated transactions from the clients are "seen" as new transactions. Furthermore, it is often highly desirable for many clusters to be kept available or "online" as much of the time as possible. Thus just bringing a cluster to a quiesce state, and then keeping it in that state only as long as necessary, are other factors that complicate performing a cluster-wide backup.

Not surprisingly, many efforts have been made to devise systems and processes for performing cluster-wide backups, but all of such to date have limitations and the field remains wanting for improved systems and process to perform cluster-wide backups.

U.S. patent Publication 2003-0188115-A1 teaches a method and computer apparatus capable of making a backup copy of data stored on a hard disk drive (HDD). A user places a personal computer (PC) with a typical (operating system) OS into a hibernation state by inputting a particular key sequence. A working state data is stored on the HDD just before the backup copy of data is created. During the backup process, another OS in a hidden partition of the HDD is booted so as to execute a program for making an exact copy of the HDD. When the exact copy processing is completed, the PC's operation is resumed and the main OS is booted to recover from the hibernation state back to the original state.

As such, the teachings of this '115 publication are limited to individual, PC computer systems. How to quiesce an entire cluster of multiple computer systems, particularly ones engaged in client-server transactions is not taught or reasonably suggested by this reference.

U.S. patent Publication 2003-0028736-A1 teaches a system and method for allowing applications to interact with a common backup program in a uniform way. A communication mechanism for one or more applications to exchange information with the backup program regarding components of the applications is provided. The information exchanged may include an identification of the components of each application. A component may be considered a group of files or resources that should be backed up or restored together. In this way, when a backup operation is initiated, each application may provide instructions to the common backup program describing the specific components to be backed up. In addition, each application may add other application-specific information useful during a restore of the backed up data.

As such, the teachings of this '736 publication are limited to individual applications advising a backup system what data components should be backed up. How even this can be performed across an entire cluster of multiple computer systems engaged in client-server transactions is not taught or reasonably suggested. This reference does teach that its form of limited backup can be performed on a system in a quiescent state, but how the system being backed up is put into such a state is left to the individual system.

U.S. Pat. No. 5,692,155 by Iskiyan et al. teaches a data storage system that atomically suspends multiple duplex pairs across either a single storage subsystem or multiple storage subsystems. The duplex pairs are suspended such that the data on the secondary direct access storage devices (DASDs) of the duplex pairs is maintained in a sequence consistent order. A host processor in the data storage system running an application generates records and record updates to be written to the primary DASDs of the duplex pairs. The storage controller directs copies of the records and record updates to the secondary DASDs of the duplex pairs. Sequence consistency is maintained on the secondary DASDs by quiescing the duplex pairs and then suspending the duplex pairs with change recording. Quiescing the duplex pairs allows any current write I/O in progress to complete to the primary DASD. The storage controller then locks out any subsequent write I/O from the host processor by raising a long busy signal to such subsequent write requests. Suspending the duplex pairs with change recording directs the storage controller to mark the physical address of the primary DASD which the application in the host processor updates between the time the duplex pair is suspended and then is reestablished.

As such, the teaches of this Iskiyan patent are limited to dual copy scheme, wherein some paired systems are "rotated" into a quiesce state for backing up while other system carry on. While quite powerful, this approach requires additional hardware and does not teach and cannot be seen to be extendable to conventional cluster computer systems.

U.S. Pat. No. 5,339,397 by Eikill et al. teaches an information processing network that includes multiple processing devices, a main storage memory, one or more disk drives or other auxiliary storage devices, and an interface for coupling the processing devices to the main storage memory and the auxiliary devices. A primary directory in main storage contains mapping information for translating virtual addresses to real addresses in the main storage. Look-aside buffers in the processing devices duplicate some of the mapping information. A primary directory hardware lock, subject to exclusive control by any one of the processing devices able to update the primary directory, inhibits access to the primary directory based on hardware address translations initiated when one of the processors holds the primary directory lock. Address translations in progress when the lock is acquired proceed to completion before the primary directory is updated under the lock. Accordingly, such updates proceed atomically relative to hardware primary directory searches. Unnecessary quiesces and purges of the look-aside buffers are eliminated, improving network performance.

As such, this Eikill patent teaches apparatus and processes for avoiding quiesces by keeping a limited set of memory online for transactions, but this is limited to specific contexts. The information processing network of Eikill uses a main storage memory and auxiliary storage. The main storage memory is quiesced for backup purposes, while transactions carry on using the auxiliary storage. While quite powerful, this approach therefore requires additional memory. Also, Eikill does not teach and it cannot be seen how this approach could be extended to a cluster of computer systems.

BHATTACHARYA et al. in "Coordinating Backup/Recovery and Data Consistency Between Database and File Systems", ACM SIGMOD '2002, discuss how managing a combined store consisting of database data and file data in a robust and consistent manner is a challenge for database systems and content management systems. In such a hybrid system, images, videos, engineering drawings, etc. are stored as files on a file server while meta-data referencing/indexing such files is created and stored in a relational database to take advantage of efficient search capabilities. This paper describes solutions for two potentially problematic aspects of such a data management system: backup/recovery and data consistency. Algorithms are presented for performing backup and recovery of the DBMS data in a coordinated fashion with the files on the file servers. This paper also proposes an efficient solution to the problem of maintaining consistency between the content of a file and the associated meta-data stored in the DBMS from a reader's point of view without holding long duration locks on meta-data tables. In the model, an object is directly accessed and edited in-place through normal file system APIs using a reference obtained via an SQL query on the database. To relate file modifications to meta-data updates, the user issues an update through the DBMS, and commits both file and meta-data updates together.

As such, this paper teaches an algorithmic approach for avoiding quiescing for backup purposes. Accordingly, much like the Iskiyan and Eikill patents, this paper teaches techniques that are useful in particular contexts but that cannot be seen to be extendable to conventional cluster computer systems.

Thus, the current systems and methods used to backup clustered computer systems remain highly inefficient. By in large, these existing approaches include quiescing one client at a time or one container (fileset) at a time, but do not keep the application state consistent throughout a data cluster of a computer system. The pre-existing backup systems interrupt client activity and any changes to the state of an application are generally lost during the backup procedure.

Otherwise, the emerging trend is to undertake substantial change to the computer systems themselves, adding storage units and control capability to manage all of the available storage so that some can quiesced for backup while other storage is employed. While these approaches have considerable merit in particular applications, their added cost and complexity are generally prohibitive.

It is, therefore, an object of the present invention to provide an efficient approach to quiesce the entire file system of a cluster of computer systems. Preferably, such an approach should also quiesce with a single command, in an atomic manner. Other objects and advantages will become apparent from the following disclosure.

SUMMARY OF THE INVENTION

Briefly, one preferred embodiment of the present invention is a process for quiescing a cluster of computer systems where the cluster includes a master system and a number of subordinate systems that each may assume either an original or a pending state, and these are either a quiesce or an online state. The master system communicates to the plurality of subordinate systems a first message requesting that either the quiesce or the online state be made the pending state. The subordinate systems then prepare to change from the original state to the particular pending state that the first message has requested. The subordinate systems further determine whether their preparation was successful, and send to the master system votes to either commit to or to abort from changing from the original to the pending state. From the votes it is determined whether all of the subordinate systems have voted to commit. The master system then communicates to the subordinate systems a second message requesting that they either commit or abort. If the second message requests to commit and the pending state is the quiesce state, an operation is performed in the subordinate systems. If the second message requests to commit and the pending state is the online state, the subordinate systems prepare to resume the original state. And if the second message requests to commit the subordinate systems finally change from the original state to the pending state. Otherwise, if the second message requests to abort, the subordinate systems prepare to remain in the original state and reset the pending to the original state.

Briefly, another preferred embodiment of the present invention is a system for quiescing a cluster of computer systems. A master system and a number of subordinate systems are provided within the cluster. Each subordinate system may assume either an original or a pending state, and these are either a quiesce or an online state. The master system may or may not be one of the subordinate systems. The master system communicates to the subordinate systems a first message requesting that either the quiesce or the online state be made the pending state. The master system also determines from vote messages whether all of the subordinate systems have voted to commit. And the master system communicates to the subordinate systems a second message requesting that they either commit or abort. The subordinate systems each prepare to change from the original to the pending state, determine whether their respective preparations were successful, and send to the master system a respective vote to either commit to or abort from changing from the original to the pending state. When the subordinate systems determine that the second message requests to commit and the pending state is the quiesce state, they perform an operation. When the subordinate systems determine that the second message requests to commit and the pending state is the online state, they prepare to resume the original state and to change from the original to the pending state. And when the subordinate systems determine that the second message requests to abort, they prepare to remain in the original state and reset the pending to the original state.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

In the various figures of the drawings, like references are used to denote like or similar elements or steps.

DETAILED DESCRIPTION OF THE PREFERRED EMBODIMENTS

Figure 1:
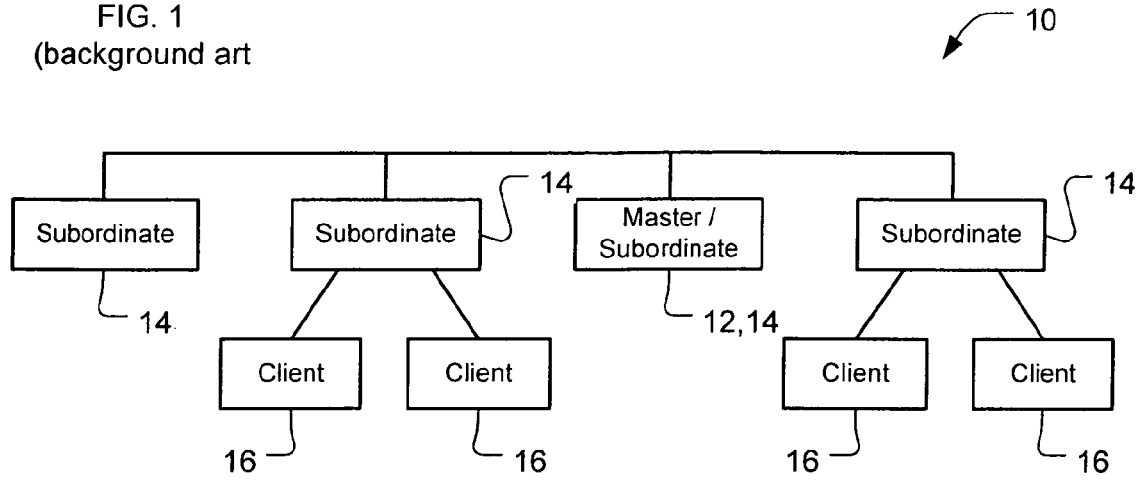
FIG. 1 (background art) is a block diagram of a cluster of computer systems, including a master system that directs multiple subordinate systems.

The present invention provides a process for quiescing a cluster of computer systems to permit an operation, such as a cluster-wide backup. As illustrated in the various drawings herein, and particularly in the view of FIG. 2, an exemplary embodiment of the invention is depicted by the general reference character 100.

FIG. 1 (background art) is a block diagram of a cluster of computer systems (cluster 10), including a master system 12 that directs multiple subordinate systems 14. Each subordinate system 14 may assume either an original state or shift to a previously designated pending state. As illustrated in FIG. 1, the master system 12 may itself also serve as a subordinate system 14. Each subordinate system 14 may, in turn, service multiple clients 16 and handle client transactions for these clients 16.

Figure 2:
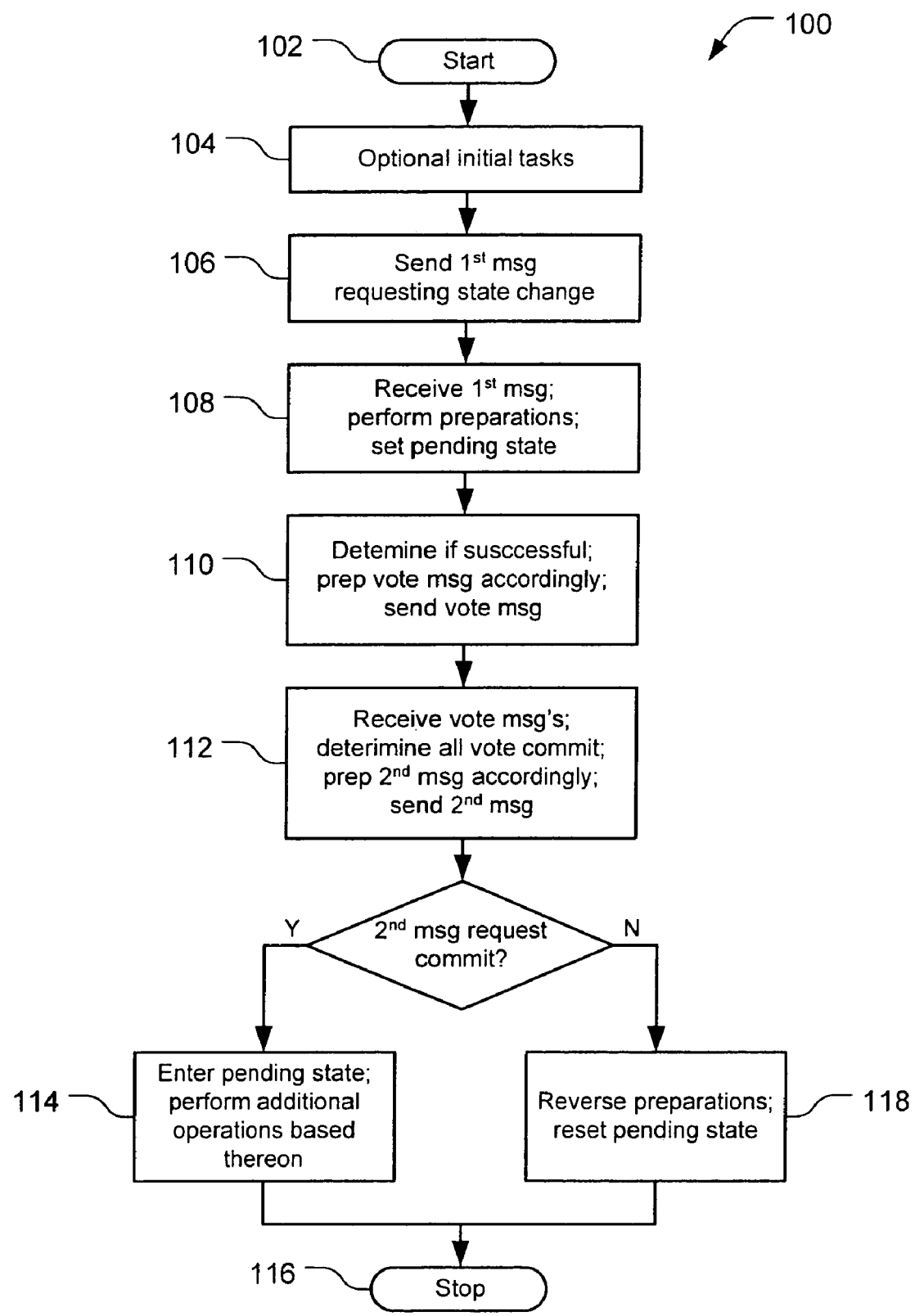
FIG. 2 is a flow chart depicting an overview of a process to quiesce the cluster of FIG. 1.

FIG. 2 is a flow chart depicting an overview of a process 100 to quiesce the cluster 10 of FIG. 1. In a step 102, the process 100 starts.

In an optional step 104, any desired initial tasks are performed.

In a step 106, the master system 12 broadcasts a first message to all of the subordinate systems 14 requesting them to make the pending state either a quiesce state or an online state.

In a step 108, the subordinate systems 14 (presumably) receive the first message, each perform preparations to shift from the original state to the requested pending state, and each set the pending state to be what was requested.

In a step 110, the subordinate systems 14 each determine whether their own preparation was successful, prepare a vote message accordingly, and send that vote message to the master system 12. The vote messages include either a commit vote indicating that preparations were successful, or an abort vote indicating that preparations were unsuccessful. Since the preparations by the respective subordinate systems 14 are performed independently, the vote messages may be sent at somewhat different times.

In a step 112, the master system 12 receives the vote messages, determines if all of the subordinate systems 14 have voted to commit, prepares a second message based on this determination, and sends that second message to the subordinate systems 14.

Since the vote messages are potentially sent at different times, the master system 12 can wait a reasonable period of time for all of the votes to arrive. Due to unexpected circumstances, however, a subordinate system 14 may not have received the first message, may have been unduly delayed while acting upon it, may have crashed at some time and thus been unable to vote, may have sent a commit vote that was not received by the master system 12, etc. If for any reason the master system 12 does not receive a vote, that is treated the same as an abort vote.

If the master system 12 has requested committing to the pending state, in a step 114 the subordinate systems 14, having received the second message, now shift from their (current) original state to the pending state, and proceed with additional operations as desired. In a step 116, the process 100 stops.

Alternately, if the master system 12 has requested aborting, in a step 118 the subordinate systems 14, having received the second message, reverse the preparations made in step 108 and reset the pending state from what it was set to in step 108. And here as well, the process 100 stops in step 116.

Figure 3:
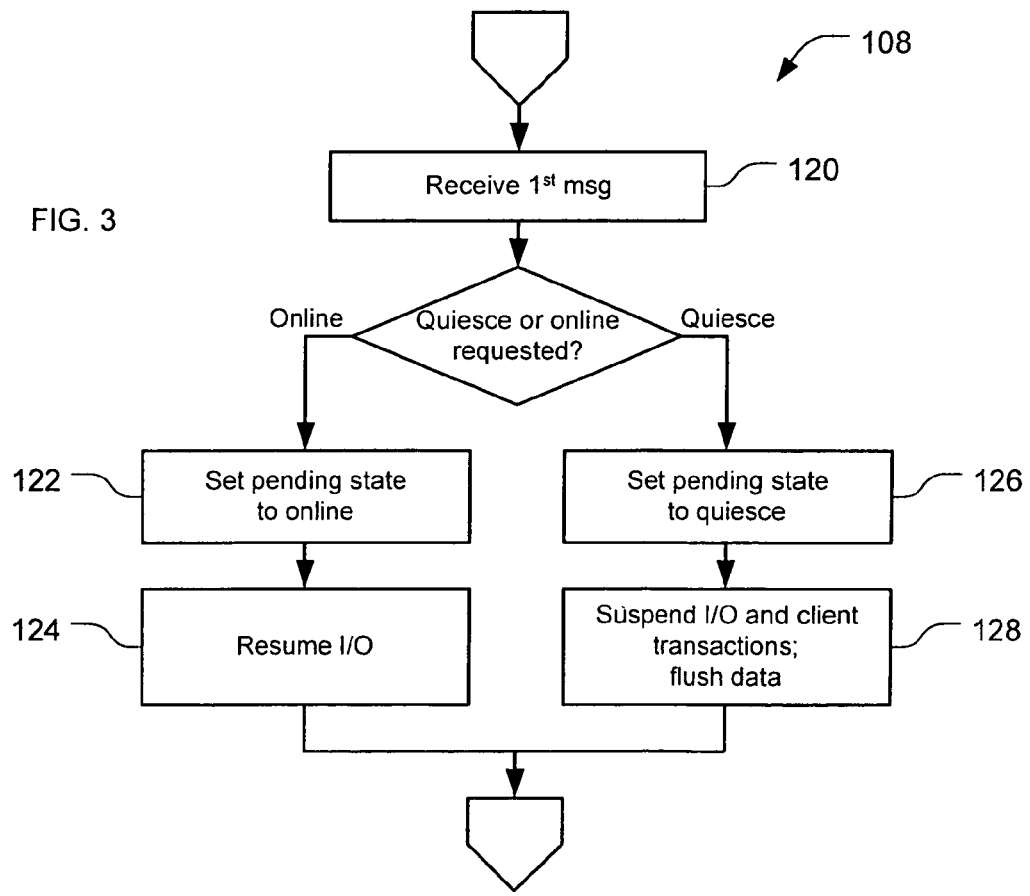
FIG. 3 is a flow chart depicting the major preparations step of the process in FIG. 2 in more detail.

FIG. 3 is a flow chart depicting step 108 of the process 100 in FIG. 2 in more detail.

In a sub-step 120, the first message from the master system 12 is received. This requests that the pending state be set to either the online state or the quiesce state.

If the online state was requested, in a sub-step 122 the pending state is set to the online state. Next, in a sub-step 124, I/O is resumed. Step 108 is now finished and the rest of the process 100 is returned to.

If the quiesce state was requested, in a sub-step 126 the pending state is set to the quiesce state. Next, in a sub-step 128, I/O transactions for clients 16 are suspended and data being held in the subordinate system 14 is flushed. Again here as well, step 108 is finished and the rest of the process 100 is returned to.

Figure 4:
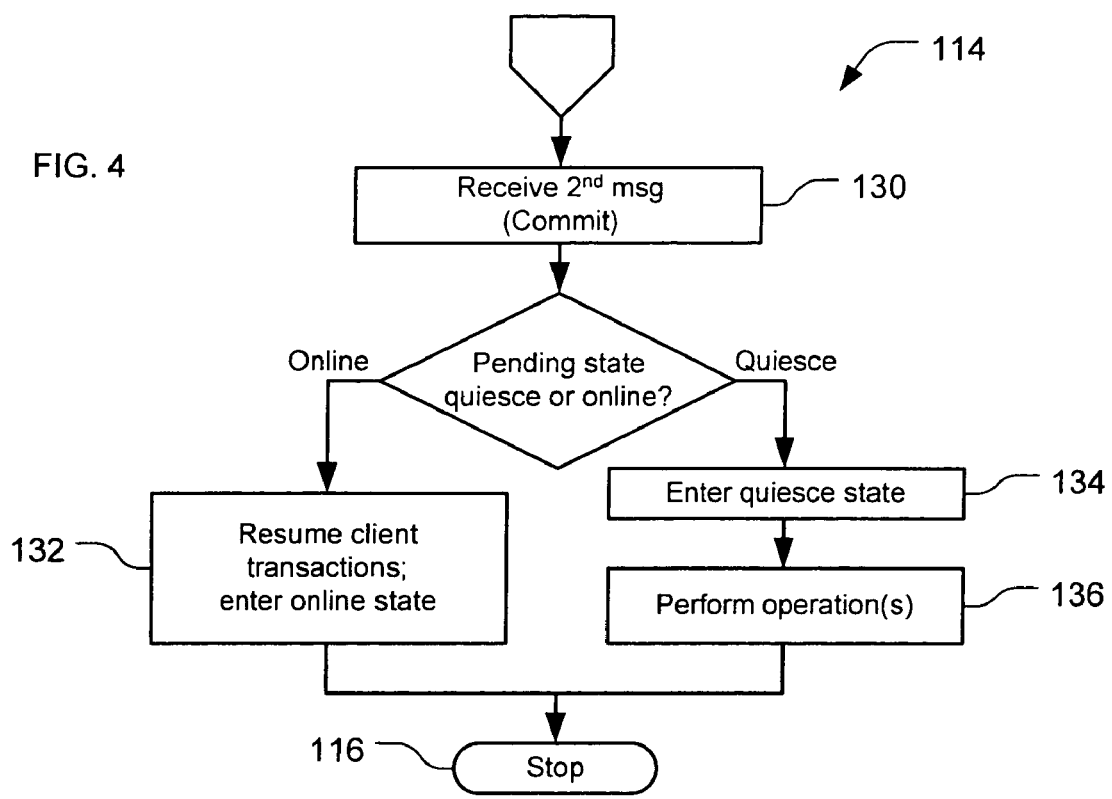
FIG. 4 is a flow chart depicting the commit step (branch) of the process in FIG. 2 in more detail.

FIG. 4 is a flow chart depicting step 114 of the process 100 in FIG. 2 in more detail.

In a sub-step 130, the second message from the master system 12 is received, and here it requests committing.

If the pending state is the online state (i.e., that was the state set in response to the first message back in step 108), in a sub-step 132 the subordinate system 14 resumes client transactions and enters the online state.

Alternately, if the pending state is the quiesce state, in a sub-step 134 the subordinate system 14 enters the quiesce state. Next in a step 136, the subordinate system 14 proceeds with additional operations as desired.

The next step for either alternative is step 116, where the process 100 stops.

Figure 5:
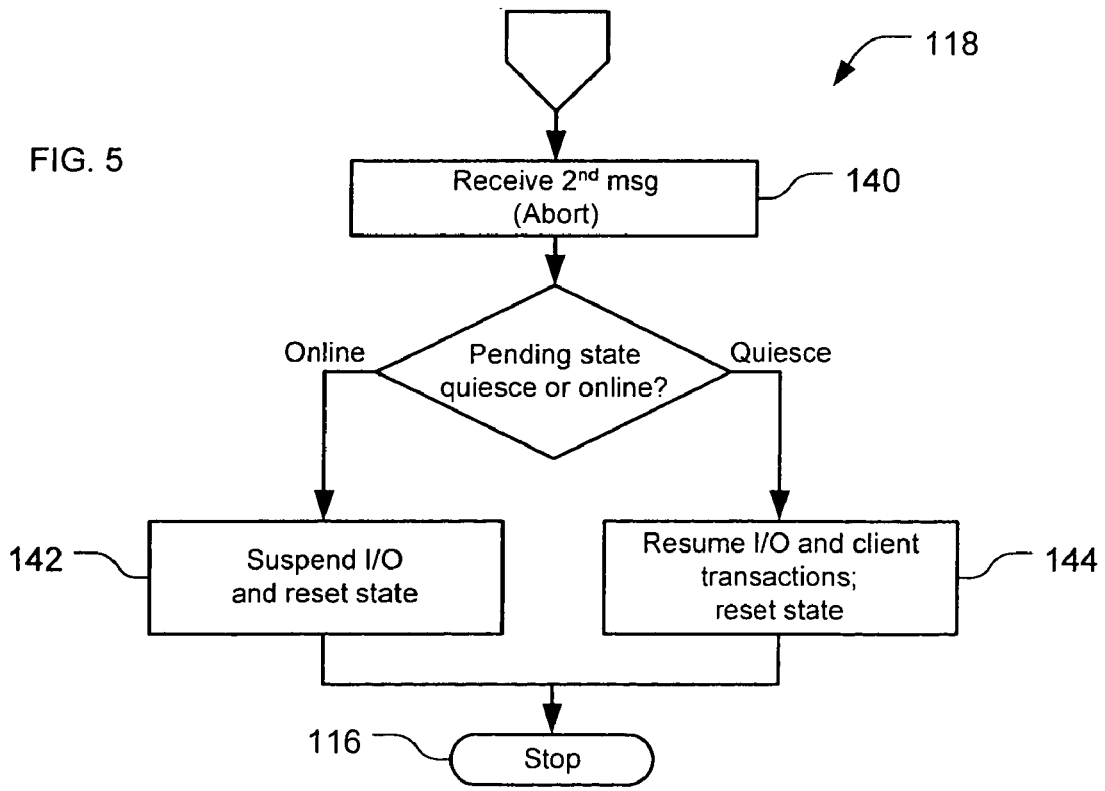
FIG. 5 is a flow chart depicting the abort step (branch) of the process in FIG. 2 in more detail.

FIG. 5 is a flow chart depicting step 118 of the process 100 in FIG. 2 in more detail.

In a sub-step 140, the second message from the master system 12 is received, and it requests aborting. If the pending state is the online state (i.e., it was the state set in response to the first message back in step 108), in a sub-step 142 the subordinate system 14 suspends I/O and resets the pending state to the original state.

Alternately, if the pending state is the quiesce state, in a sub-step 144 the subordinate system 14 here resumes I/O and client transactions, and resets the pending state to the original state.

Here as well, the next step for either alternative is step 116, where the process 100 stops.

In the discussion above it was noted in passing that additional operations in step 114, and specifically in step 136, can be performed in the quiesce state. Being able to queisce the cluster 10 to perform these operations and then resume online, conventional operations is essentially the reason for the process 100.

For example, the process 100 is particularly useful to put the subordinate systems 14 into the quiesce state to perform a LUN-based backup of the entire file system of the cluster 10.

The problem here is to provide a way to take a consistent, stable backup of the entire distributed file system of the cluster 10 with only a minimal interruption of activity at the clients 16. Known solutions to this problem include quiescing one client 16 at a time or one container (fileset) at a time, but do not solve any of the problems of keeping the state consistent throughout the cluster 10. The process 100, however, provides a single command to quiesce the entire file system of the cluster 10.

A major advantage of using the process 100 for this is that the quiesce operation is atomic. Whether or not entering the quiesce state succeeds, the entire cluster 10 remains in a consistent state. Prior art solutions require several independent operations to perform the same task. Any one of these could fail; leaving the file system in an inconsistent state that can only be repaired manually.

There are also additional advantages. With the present inventive approach, a backup can be a simple LUN-based backup, performed entirely in hardware. Also, while it is unavoidable that the clients 16 must pause their activity, their application state is preserved. As soon as the cluster 10 is put back online, the clients 16 can reassert their locks and resume normal operation.

Recapping, the master system 12 initiates the transition by broadcasting a first (prepare) message to all of the subordinate systems 14 (including itself).

Upon receiving that message, each subordinate system 14 performs prepare work, as needed. To quiesce, each subordinate system 14 suspends all new transactions, revokes all data locks, waits for its clients 16 to flush their caches (completing active transactions), flush their logs, and suspend metadata disk I/O. For an optional partial quiesce, each subordinate system 14 suspends all new transactions, waits for its clients 16 to complete active transactions, flush their logs, and suspend metadata disk I/O. Note, here the clients 16 do not flush their caches and the subordinate systems 14 do not revoke the data locks. The advantage to this is that the quiesce process is much faster and the metadata is in a consistent state, although the client data is not.

To go online, the subordinate system 14 simply resumes metadata disk I/O. If all of the prepare work is successful, the subordinate system 14 sends a commit message to the master system 12, and if not, it sends an abort message.

It should be noted that transactions are only serviced when a subordinate system 14 is in the online state and is not in transition. As soon as a transition to the quiesce state starts, the clients 16 are told to retry all transaction requests. A transition to the online state, however, must complete before transactions are serviced again.

Continuing, if the master system 12 receives unanimous consent to commit, it broadcasts a second message (here instructing to commit). If the master system 12 receives one or more abort messages or any subordinate system 14 crashes, the master system 12 also broadcasts the second message (but here instructing to abort).

If a subordinate system 14 receives a second message instructing that it commit, it makes the pending state (the new state that it prepared for in response to the first message) its (current) official state. [Each subordinate system 14 keeps its own state, but only the master system 12 keeps the official state of the cluster 10. This state is not committed until after all of the subordinate systems 14 acknowledge that they have committed the new state.] The subordinate system 14 then can carry on accordingly in that official state. If the official state now is the online state, that means the subordinate 14 can carry on online activities. Alternately, if the official state now is the quiesce state, that means the subordinate 14 can carry on activities that the quiesce state facilitates, e.g., a backup.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A process for quiescing a cluster of computer systems, wherein said cluster includes a master system and a plurality of subordinate systems that each may assume both an original state and a pending state that are either a quiesce state or an online state, the process comprising:
   (a) communicating from said master system to said plurality of subordinate systems a first message, wherein said first message requests that either said quiesce state or said online state be made said pending state;
   (b) preparing said plurality of subordinate systems to change from said original state to said pending state that was requested in said first message, wherein said preparing includes:
      (i) setting said pending state to be a partial state of the quiesce state;
      (ii) suspending input and output transactions with any client systems of said plurality of subordinate systems;
      (iii) flushing data for said transactions; and
      (iv) revoking data locks for and waiting for said client systems to flush logs;
   (c) determining in said plurality of subordinate systems whether said step (b) was successful;
   (d) sending vote messages from said plurality of subordinate systems to said master system, wherein each of the vote messages include a vote to either commit to or abort from changing from said original state to said pending state;
   (e) determining from said vote messages whether all of said plurality of subordinate systems have voted to commit;
   (f) communicating from said master system to said plurality of subordinate systems a second message, wherein said second message requests that said plurality of subordinate systems either commit or abort;
   (g) if said second message requests to commit, then:
      (i) if said pending state is said quiesce state, performing an operation in said plurality of subordinate systems;
      (ii) if said pending state is said online state, preparing said subordinate systems to resume said original state; and
      (iii) changing said plurality of subordinate systems from said original state to said pending state; and
   (h) if said second message requests to abort, then:
      (i) preparing said plurality of subordinate systems to remain in said original state; and
      (ii) resetting said pending state to said original state.

2. The process of claim 1, wherein said step (b) includes setting said pending state to be said online state and resuming said input and output transactions with said any client systems of said plurality of subordinate systems.

3. The process of claim 1, wherein said operation in said step (g)(i) includes performing a data backup of the cluster of computer systems.

4. The process of claim 3, wherein said data backup is a logical unit number (LUN) based backup.

5. The process of claim 1, wherein said operation in said step (g)(ii) includes resuming said input and output transactions with said any client systems of said plurality of subordinate systems.

6. The process of claim 1, wherein if said pending state is the quiesce state, said step (h)(i) includes resuming said input and output transactions with said any client systems of said plurality of subordinate systems.

7. The process of claim 1, wherein if said pending state is the online state, said step (h)(i) suspending said input and output transactions with said any client systems of said plurality of subordinate systems, and flushing data being held in buffers for said transactions.

8. A system for quiescing a cluster of computer systems, the system, comprising:
 a master system within the cluster;
 a plurality of subordinate systems within the cluster that each may assume both an original state and a pending state that are either a quiesce state or an online state, wherein said master system may or may not be one of said plurality of subordinate systems;
 said master system to:
  communicate to said plurality of subordinate systems a first message requesting that either said quiesce state or said online state be made said pending state;
  determine from vote messages whether all of said plurality of subordinate systems have voted to commit; and
  communicate to said plurality of subordinate systems a second message requesting that said plurality of subordinate systems either commit or abort; and
 said plurality of subordinate systems to each:
  prepare to change from said original state to said pending state, wherein said preparing includes:
   (i) setting said pending state to be a partial state of the quiesce state;
   (ii) suspending input and output transactions with any client systems of said plurality of subordinate systems;
   (iii) revoking data locks for and waiting for said client systems to flush logs; and
   (iv) flushing data for said transactions; determine whether its respective said preparation was successful;
  send to said master system a respective said vote message voting to either commit to or abort from changing from said original state to said pending state;
  determine if said second message requests to commit, and when said pending state is said quiesce state perform an operation, and when said pending state is said online state prepare to resume said original state, and to change from said original state to said pending state; and
  determine if said second message requests to abort, and prepare to remain in said original state, and reset said pending state to said original state.

9. The system of claim 8, wherein, in response to a said first message requesting that said pending state be said online state, said plurality of subordinate systems each further to set its said pending state to be said online state and to resume said input and output transactions with said any client systems it has.

10. The system of claim 8, wherein said operation is a data backup.

11. The system of claim 10, wherein said data backup is part of a logical unit number (LUN) based backup.

12. The system of claim 8, wherein, in response to a said second message requesting to commit, said plurality of subordinate systems each further to resume said input and output transactions with said any client systems it has.

13. The system of claim 8, wherein, in response to a said second message requesting to abort and a said pending state that is the quiesce state, said plurality of subordinate systems each further to resume said input and output transactions with any said client systems it has.

14. The system of claim 8, wherein, in response to a said second message requesting to abort and a said pending state that is the online state, said plurality of subordinate systems each further to suspend said input and output transactions with any said client systems it has, and to flush said data being held in buffers for said transactions.

15. A system for quiescing a cluster of computer systems, the system, comprising:
 a master system within the cluster;
 a plurality of subordinate systems within the cluster that each may assume both an original state and a pending state that are either a quiesce state or an online state, wherein said master system may or may not be one of said plurality of subordinate systems;
 said master system includes:
  means for communicating to said plurality of subordinate systems a first message requesting that either said quiesce state or said online state be made said pending state;
  means for determining from vote messages whether all of said plurality of subordinate systems have voted to commit; and
  means for communicating to said plurality of subordinate systems a second message requesting that said plurality of subordinate systems either commit or abort; and
 said plurality of subordinate systems each including:
  means for preparing to change from said original state to said pending state,
   wherein said preparing includes:
   (i) setting said pending state to be a state of the said quiesce state:
   (ii) suspending input and output transactions with any client systems of said plurality of subordinate systems;
   (iii) revoking data locks for and waiting for said client systems to flush logs; and
   (iv) flushing data for said transactions;
  means for determining whether its respective said preparation was successful;
  means for sending to said master system a respective said vote message voting to either commit to or abort from changing from said original state to said pending state;
  means for determining if said second message requests to commit, including means for performing an operation when said pending state is said quiesce state, and means for preparing to resume said original state when said pending state is said online state, and means for changing from said original state to said pending state; and
  means for determining if said second message requests to abort, including means for preparing to remain in said original state, and means for resetting said pending state to said original state.

16. The system of claim 15, wherein said operation is a data backup of the cluster of computer systems.

17. A process for quiescing a cluster of computer systems, wherein said cluster includes a master system and a plurality of subordinate systems that each may assume both an original state and a pending state that are either a quiesce state or an online state, the process comprising:
   (a) communicating from said master system to said plurality of subordinate systems a first message requesting that either said quiesce state or said online state be made said pending state;
   (b) preparing said plurality of subordinate systems to change from said original state to said pending state that was requested in said first message, wherein said preparing includes:
      (i) setting said pending state to be a partial state of the quiesce state;
      (ii) suspending input and output transactions with any client systems of said plurality of subordinate systems;
      (iii) flushing data for said transactions; and
      (iv) revoking data locks for and waiting for said client systems to flush logs;
   (c) sending from said plurality of subordinate systems to said master system votes to either commit to or abort from changing from said original state to said pending state;
   (d) communicating from said master system to said plurality of subordinate systems a second message requesting that said plurality of subordinate systems either commit or abort;
   (e) if said second message requests to commit, then changing said plurality of subordinate systems from said original state to said pending state; and
   (g) if said second message requests to abort, then resetting said pending state to said original state.

18. The process of claim 17, wherein said preparing includes determining in said plurality of subordinate systems whether said step (a) was successful.

19. The process of claim 17, wherein said preparing includes setting said pending state to be said online state and resuming said input and output transactions with said any client systems of said plurality of subordinate systems.

20. The process of claim 17, further comprising after said step (c), determining from said votes whether all of said plurality of subordinate systems have voted to commit.

21. The process of claim 17, wherein said step (d), includes, performing a data backup of the cluster of computer systems when in said quiesce state.

* * * * *